United States Patent [19]
Takahashi et al.

[11] 4,050,142
[45] Sept. 27, 1977

[54] METHOD AND APPARATUS FOR MANUFACTURING EXTRUDED STRUCTURAL PROFILES FROM ALUMINUM BASED METAL SCRAPS

[75] Inventors: Toshiro Takahashi; Toshihiro Nagano, both of Shizuoka; Shozo Iguchi, Shizuoka; Masaru Kikuchi, Fiji; Katsuhiko Nakamura, Shizuoka; Atsushi Mochizuki, Shimizu, all of Japan

[73] Assignee: Riken Keikinzoku Kogyo Kabushiki Kaisha, Shizuoka, Japan

[21] Appl. No.: 585,860

[22] Filed: June 11, 1975

[30] Foreign Application Priority Data

June 14, 1974 Japan .................................. 49-67944

[51] Int. Cl.² ........................................... B23Q 17/00
[52] U.S. Cl. ........................................ 29/403; 29/420
[58] Field of Search ...................... 29/420, 420.5, 403

[56] References Cited

U.S. PATENT DOCUMENTS

| | | | |
|---|---|---|---|
| 2,391,752 | 12/1945 | Stern | 29/403 X |
| 2,967,613 | 1/1961 | Ellis et al. | 29/420.5 X |
| 3,626,578 | 12/1971 | Price et al. | 29/420.5 |

Primary Examiner—C.W. Lanham
Assistant Examiner—V. K. Rising
Attorney, Agent, or Firm—Finnegan, Henderson, Farabow & Garrett

[57] ABSTRACT

Aluminum or aluminum alloy scraps or wastes are broken into chips and extruded under a high temperature to produce extruded structural profiles. The method is characterized by the fact that the interior of the extruder is evacuated prior to or simultaneously with the extrusion step so as to exhaust air entrapped in the body of the chips. There is also disclosed apparatus suitable for performing the method.

5 Claims, 10 Drawing Figures

METHOD AND APPARATUS FOR MANUFACTURING EXTRUDED STRUCTURAL PROFILES FROM ALUMINUM BASED METAL SCRAPS

The present invention relates to a method and apparatus for manufacturing extruded structural profiles from aluminum or aluminum alloy scrap or waste.

Aluminum or aluminum alloy extrusions have found their utility widely in various fields as structural members, for example, in buildings due to their light weight and corrosion-resistance property. Thus, the amount of manufacture of such aluminum or aluminum alloy extrusions has increased year by year. Such increase in production of extrusions causes, as a matter of fact, an increase in the amount of discard or waste produced in extrusion process. Further, tremendous amount of scraps are produced during fabrication and assembling of the extrusions. Thus, there is an increased need for development of a technique for effective recovery of such scraps and wastes.

Known process for recovering scraps includes steps of melting the scraps and forming into billets, and then extruding the billets through an appropriately shaped mould to form extrusions. In the known process, however, it is required to add an adequate amount of virgin metal in the melting step in order to ensure a satisfactory extrudability. Further, the known process is disadvantageous in respect of high every consumption in the melting step as well as heavy metal losses. Therefore, it has been proposed to extrude aluminum or aluminum alloy scraps directly through a mould to form extruded structural profiles. For example, the U.S. Pat. No. 2,391,752 issued on Dec. 25, 1945 to Max Stern teaches to extrude aluminum or aluminum alloy scraps directly through a mould. As Stern has recognized in his patent, one of the problems encountered in the directly extruding of aluminum or aluminum alloy scraps is treatment of oxide skins or oxide films coating the scrap pieces. If the extruding pressure is not sufficient to disrupt these oxide skins or films, they will prevent metallic contact of individual scrap pieces resulting in products of less uniformity and less mechanical strength. Thus, Stern proposes to have aluminum and aluminum alloy scraps and wastes subjected to pressure of 3 to 8 tons/in$^2$ in an extruder housing under the temperature of about 300° C in order to loosen the oxide skins and then extruding the scraps and wastes under the pressure of 18 to 40 tons-/in$^2$ at a temperature between about 350° to 450° C. The Stern's process has been found effective to solve the problems inherent to the oxide skins existing on the scrap pieces, however, it is not effective to eliminate problems caused by air entrapped in the extruder housing.

Such air entrapped in the extruder housing provides resistance to the movement of extruding ram and forms voids in the extrusions. Thus, existence of air in the extruder housing has adverse effects on the quality and strength of the final products.

Therefore, the present invention has an object provide a method for producing extruded structural profiles directly from aluminum or aluminum alloy scrap or wastes, which is free from the aforementioned problems.

The aforementioned problems in extruding aluminum or aluminum alloy scraps directly through a mould can be solved, in accordance with the present invention, by exhausting air in the extruder housing prior to extrusion step.

Thus, another object of the present invention is to provide a method for extruding aluminum or aluminum alloy scraps directly through a mould while subjecting them to a reduced air pressure.

A further object of the present invention is to provide an apparatus for extruding aluminum or aluminum alloy scraps while subjecting them to a reduced air pressure.

Yet another object of the present invention is to provide a method and apparatus which can convert substantially all of the metallic components in the aluminum and aluminum alloy scraps into extruded structural profiles without any appreciable metal losses to produce void-free, high strength extrusions of uniform quality.

According to the present invention, the above and other objects can be achieved by a method of producing extruded structural profiles from aluminum based metal scrap materials, the method comprising steps of introducing the scrap materials into an extruder housing, exhausting air from the extruder housing and extruding the scrap material under a high temperature.

Further, according to the present invention, there is also provided an apparatus for producing extruded structural profiles from aluminum based metal scrap materials, said apparatus comprising extruder housing means for receiving the scrap materials to be extruded, die means disposed at one end of said housing means and having extruding opening means, power operated extruding ram means slidably disposed in said extruder housing means for applying extruding pressure to the scraps in the housing means, and means for exhausting air from the housing means.

The above and other objects and features of the present invention will become apparent from the following descriptions of preferred embodiments taking reference to the accompanying drawings, in which:

FIG. 1 is a diagrammatical sectional view of an extruding apparatus embodying the feature of the present invention;

FIGS. 2a, b and c are schematic drawings showing sequential steps of extruding process in accordance with the present invention;

Figure 1:
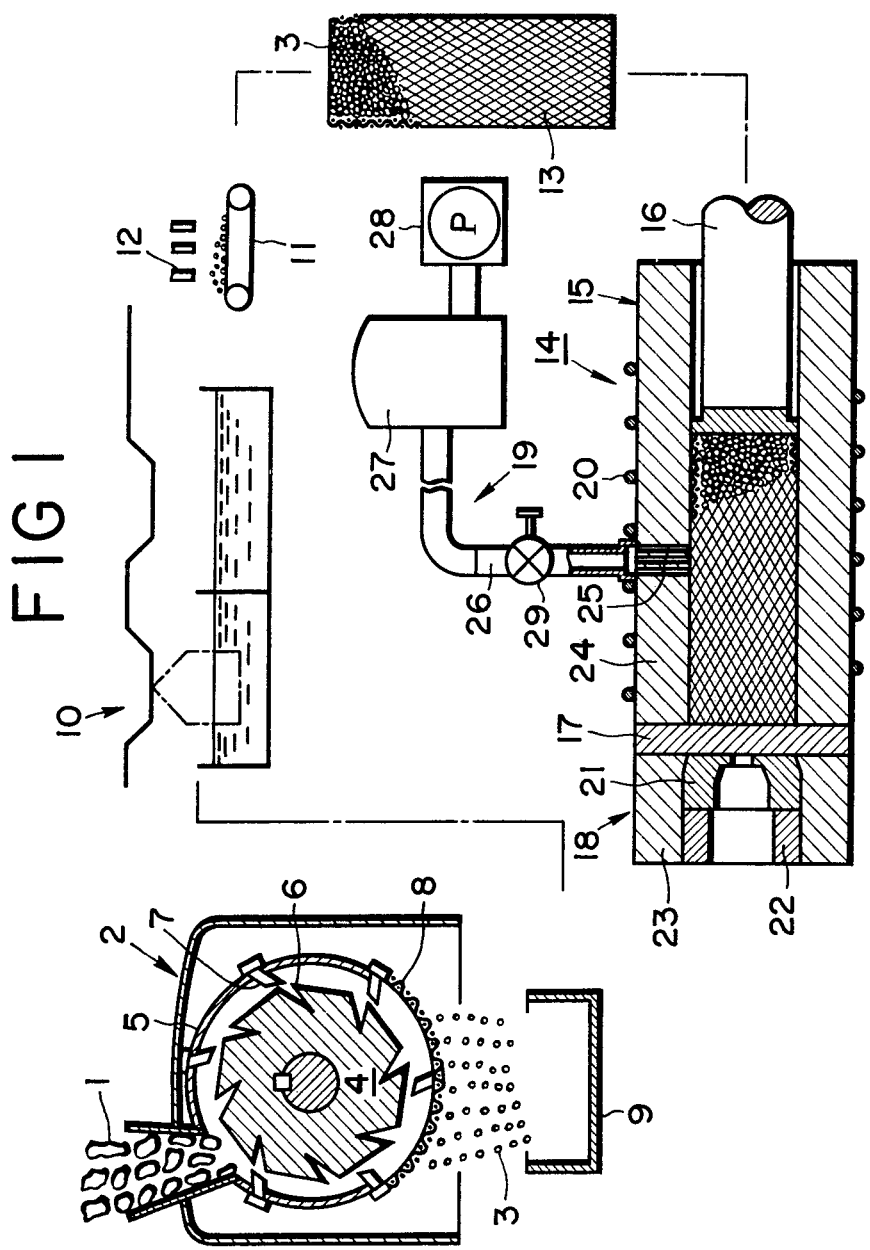

Referring now to the drawings, particularly to FIG. 1, there is shown a preferred example of the process for producing extrusions from aluminum based metal scrap materials such as aluminum or aluminum alloy scraps or wastes.

In the preferred process shown in FIG. 1, the aluminum based metal scrap materials 1 are crashed into pieces or chips 3 by means of a crasher 2 which may be of a conventional type. In FIG. 1, the crasher 2 includes a rotor 4 formed with cutter blades 6 on the outer periphery, and a housing 5 having stationary blades 7 for co-operation with the rotating blades 6. The housing 5 is provided at its lower side with a screen or a perforated plate 8 through which the crashed chips 3 fall onto a receiving plate 9. It is preferred that the chips 3 have side surface area of approximately 25 mm². The chips 3 are then transferred into washing or cleaning means 10 where they are cleaned to remove oil or other contaminents which may have adverse effect on the final product. Various types of known cleaning agents, such as trichlene vapour or nitric acid may be used for the purpose. When nitric acid is used, the cleaning process is performed by dipping the chips in a 15 percent solution of $HNO_3$ for about 10 to 20 minutes, washing by water, dipping in a 5 percent solution of NaOH at a temperature of about 50° C for about 3 to 5 minutes, dipping again in 15 to 20 percent solution of $HNO_3$ and washing by water. After the washing, the chips 3 are dried by being conveyed by a conveyor 11 beneath a heat source 12. The dried chips 3 are then introduced into a cage 13 in which they are heated to a temperature suitable for extrusion of the metal, that is, about 400° to 500° C. The cage 13 containing heated chips 3 are inserted into an extruder 14 having an extruder housing 15 in order to have the chips 3 extruded in accordance with the present invention. Alternatively, the dried chips 3 may be introduced into the extruder housing 15 without using any cage or the like. For example, they may be introduced into the extruder housing 15 from a hopper or the like, or they may be injected into the housing by compressed air.

The scrap materials may not necessarily be crashed into chips as described above but they may be brought into extruding process simply after being cleaned and heated.

In conventional extruding process in which aluminum based metal scrap materials are extruded into a desired shape of extrusion, the air existing in gaps among the scraps or chips is substantially entrapped in the final product causing voids in the extruded structural profile. Thus, the mechanical strength of the final product is substantially decreased. Further, when such voids are in the vicinity of the surface of the extrusion, the surface of the extrusion is locally bulged out resulting in a rough and mechanically weak surface.

The present invention is characterized by the fact that air in the extruder housing is exhausted prior to the extrusion step so that minimum amount of air is retained in the gaps among the scraps or chips. Therefore, it is possible to ensure a good metallic contact of the scraps or chips to attain their union into uniform and strong metallic bodies.

Referring further to FIG. 1, the extruder 14 shown therein includes the aforementioned extruder housing 15 in which a ram 16 is slidably received. The housing 15 is provided at one end with an end plate 17 and a die assembly 18. Further, the extruder 14 is also provided with an evacuating device 19 which communicates with the interior of the extruder housing 15, and a heating device 20 disposed to encircle the extruder housing 15 for heating the interior of the housing. The die assembly 18 is of a conventional type which includes a die 21, a backing member 22 co-axial with the die 21, and a die holder 23 which encircles the die 21 and the backing member 22.

The evacuating device 19 includes a conduit 26 connected to a hole 25 in the side wall 24 of the housing 15, a vacuum tank 27 connected with the conduit 26, a vacuum pumps 28 for applying suction to the vacuum tank, and a control valve 29 disposed in the conduit 26 for controlling the rate of exhaust of air from the extruder housing 15.

In operation, a suitable amount of aluminum based metal scrap materials are introduced into the extruder housing 15 either in the form of crashed chips 3 which are contained in a cage 13, or a non-crashed scraps which are introduced into the extruder housing 15 from a hopper or with the aid of air stream. Then, the housing 15 is sealed at one end by the end plate 17 and at the other end by the ram 16, and the control valve 29 is opened to connect the vacuum tank 27 with the interior of the extruder housing 15. Thus, the interior of the housing 15 is evacuated to a pressure below 50 mmHg, preferably 20 to 50 mmHg. Thereafter, the control valve 16 is closed and the ram 16 is advanced to compact the materials in the housing. In this instance, the materials in the extruder housing 15 are pressed onto the end plate 17 and the inner wall surface of the housing side wall 24. Then, the end plate 17 is retracted either upwardly or downwardly and the die assembly 18 is shifted to be placed at the end of the extruder housing 15. The ram 16 is then further advanced to extrude the materials in the extruder housing 15 through the die 21 to form an extruded structural profiles of a desired shape. Preferably, the materials to be extruded are preheated to a temperature of about 400° to 500° C before they are introduced into the extrude housing 15, however, it is also possible to heat the materials by the heating device 20. The heating device 20 may also be used to prevent possible temperature decrease during extruding process.

Referring now to FIG. 2, there is shown another embodiment of the present invention. The extruder shown in FIG. 2 includes a die 30 which is secured to a die holder 31 and includes an orifice 32.

The die 30 has a cylindrical portion 33 which is adapted to be removably inserted into an end of extruder housing 34. The extruder housing 34 is formed, adjacent to the end where the die cylindrical portion 33 is inserted, with an evacuating hole 35. The arrangement is such that the hole 35 can be closed by the cylindrical portion 33 of the die 30 when the die 30 is fully inserted into the extruder housing 34. In the extruder housing 34, there is slidably disposed a power operated ram 36 which may be of a conventional type as commonly employed in extruders. The ram 36 is supported by a ram holder 37. In order to provide air-tight seal, sealing members 38 are disposed between the inner wall surface of the extruder housing 34 and the die 30, and between the ram 36 and the ram holder 37.

Figure 2A:
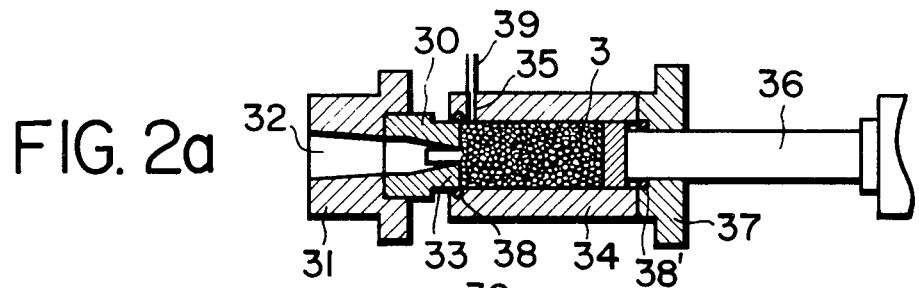

The materials to be extruded are charged in the extruder housing 34 in a similar manner as in the previous embodiment. In this instance, the evacuating hole 35 is opened as shown in FIG. 2a and the ram 36 is advanced to compact the materials 3 simultaneously drawing air from the extruder housing 34 through the evacuating hole 35. Thus, the air pressure in the extruder housing 34 is decreased preferably to about 20 to 50 mmHg.

Figure 2B:
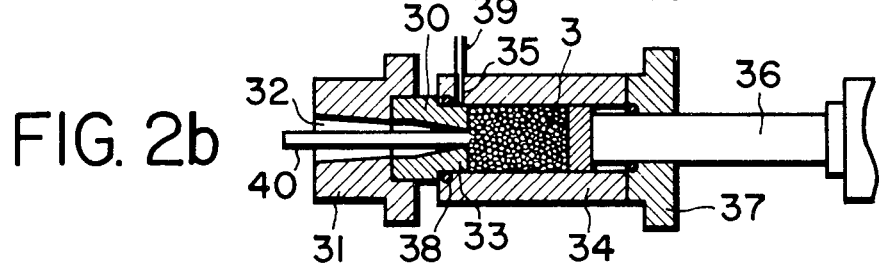
Figure 2C:
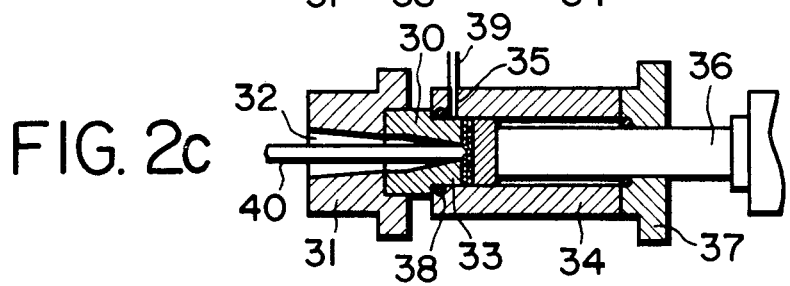

The evacuating hole 35 is connected with a pipe 39 which is in turn connected with vacuum means as in the embodiment shown in FIG. 1, and a control valve is suitably adjusted to attain a desired result. After evacuation, the die 30 is shifted toward the extruder housing until the evacuating hole 35 is closed by the cylindrical portion 33. (FIG. 2b). The ram 36 is then advanced to extrude the materials in the housing 34 to produce an extrusion (FIG. 2c).

Figure 3:
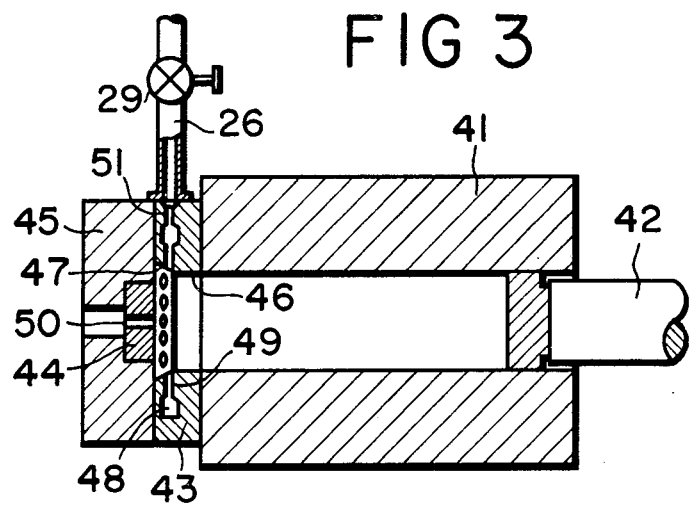
FIG. 3 is a sectional view showing an extruding apparatus in accordance with another embodiment of the present invention.

Another embodiment of the present invention will now be described with reference to FIG. 3. The extruder shown in FIG. 3 includes an extruder housing 41 and a ram 42 slidably disposed in the housing 41 and provided with a dummy block. The housing 41 is provided at one end with an end plate 43 and a die ring 45 which has a die 44 adapted to be placed at the extruding end of the housing 41.

The housing 41 and the ram 42 may be of conventional types, and the plate 43 has a central opening 46 which is adapted to align with the bore of the housing. The opening 46 in the plate 43 is conically expanded at the side facing to the die ring 45 by means of a tapered wall 47. The plate 43 is provided with an annular chamber 48 which opens through a plurality of apertures 49 to the tapered wall surface 47. The diameters of the apertures 49 are small in relation to the die opening 50 and also to the materials to be extruded. The annular chamber 48 is connected through a radial passage 51 with an evacuating conduit 26 of vacuum means having a control valve 29.

The die ring 45 carrying the die 44 is air-tightly and retractably mounted on the end of the plate 43. When the ram 42 is advanced to compress the materials charged in the extruder housing 41, the materials are forced toward the die 44 to clog the die opening 50. Then, the control valve 29 is opened to evacuate the housing 41 through the apertures 49 and the passage 51. Thus, the air pressure in the housing 41 is decreased preferably to 20 to 50 mmHg. Thereafter, the control valve 29 is closed and the ram 42 is further advanced to perform extruding operation.

After extruding operation is completed, the die ring 45 is shifted apart from the extruder housing 41 and the extruded product is separated from the discard. The discard remaining in the plate 43 and the extruder housing 41 can be readily drawn therefrom due to the provision of the tapered wall 47. Since the evacuating apertures 49 are small in relation to the dimensions of the materials to be extruded, there is minimum possibility that the apertures 49 are clogged by metal chips. Further, since the evacuation is performed after the extruding opening is clogged by the metal to be extruded, any leakage through the extruding opening can be avoided. The provision of a plurality of evacuating apertures 49 is advantageous in that possible clogging of one or more of the apertures does not cause insufficient evacuation. In the actual practice, the materials to be extruded are forced to flow toward the extruding opening as the ram is advanced so that the density of the metal in the vicinity of the evacuating apertures 49 is low as compared with that at the diametrically central portion. Therefore, there is substantially no possibility that the evacuating apertures are clogged by the metal chips.

Figure 4:
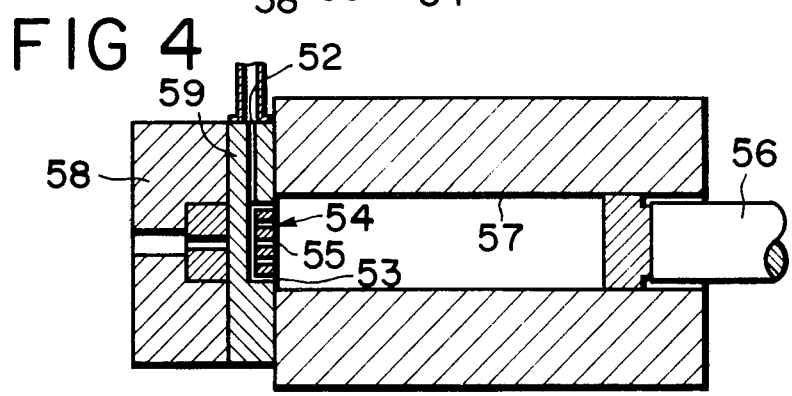
FIG. 4 is a sectional view showing an extruder in accordance with a further embodiment of the present invention.

FIG. 4 shows a further embodiment of the present invention in which end plate is retracted after evacuating step. In this embodiment, the end plate 59 includes a passage 52 communicating with a vacuum tank (not shown), a recess 53 provided at one end surface of the plate and communicating with the passage 52, and a perforated member 54 having a plurality of apertures 55 and disposed in the recess 53.

In operation, the interior of the extruder housing is evacuated through the apertures 55 and the ram 56 is advanced to compress the material in the housing until metal is compacted and in closed contact with the inner wall 57 of the housing. Then, the plate 59 is retracted and the die ring 58 is shifted to engage the extruding end of the extruder housing. Since the metal is in close contact with the inner wall of the extrude housing and sufficiently compacted, there is no possibility that air is reintroduced into the body of the compacted metal body. The ram 56 is then advanced under a high pressure to perform extruding operation. Here again, since the apertures 55 are small in relation to the dimension of the metal chips, there is no possibility that the apertures are clogged by them.

Figure 5:
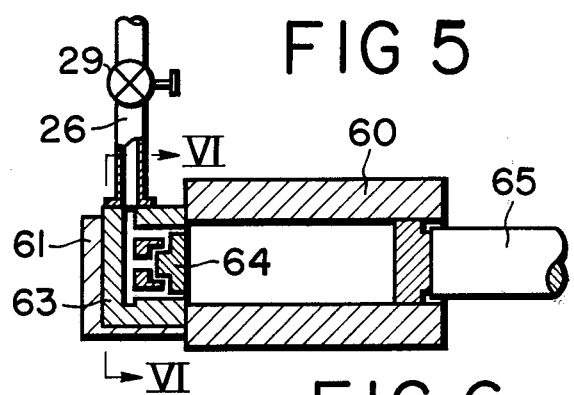
FIG. 5 is a sectional view of an extruding apparatus in accordance with a further embodiment of the present invention.
Figure 6:
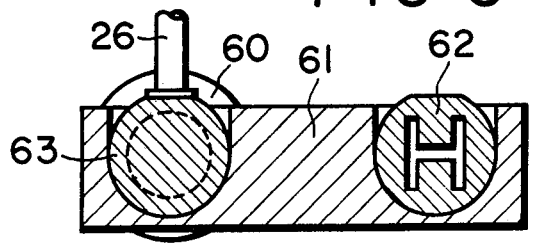
FIG. 6 is a view as seen substantially along the line VI—VI in FIG. 5.

FIG. 5 shows an example in which a die slide 61 is air-tightly and slidably disposed at the extruding end of the extruder housing 60. The die slide 61 includes an extruder die 62 and a blind die ring 63 which has a passage communicating with the evacuating or vacuum device. As shown in FIG. 5, the die ring 63 carries an evacuating plate 64. After the extruder housing 60 is charged with metal to be extruded, the die ring 63 in the die slide 61 is moved in place so that it is disposed in confronting relationship with the bore of the extruder housing 60. Then, the evacuating device is operated to apply a suction pressure to the interior of the extruder housing. The ram 65 is then actuated to compact the metal in the housing. Thereafter, the die slide 61 is shifted to the position in which the extruding die 62 is placed in the operative position. Then, the ram 65 is further advanced to perform the extruding operation.

Figure 7:
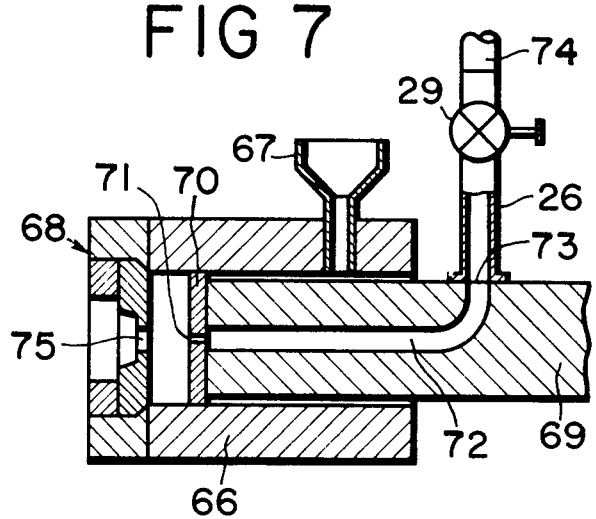
FIG. 7 is a sectional view showing an extruding apparatus in accordance with still further embodiment of the present invention.

FIG. 7 shows another embodiment of the present invention in which the extruding ram is provided with evacuating passage means. The extruder shown in FIG. 7 includes a hopper 67 through which metal chips are charged into the extruder housing 66. The extruder housing 66 is provided at one end with a die assembly 68 and a ram 69 is slidably disposed in the housing 66. The ram 69 has at its forward end a dummy block 70 which is formed with an aperture 71. The ram 69 is formed with a passage 72 which communicates at one end with the aperture 71 and at the other end 73 through a pipe 26 having a control valve 29 and a flexible hose 74 with an evacuating device (not shown). It is of course possible to provide a plurality of apertures 71 in the dummy block 70. In such a case, the adjacent end of the passage 72 may be conically enlarged.

With the control valve 29 in closed position, the material to be extruded, either in the form of chips or scraps, is charged from the hopper 67 into the extruder housing 66. The ram 69 is then advanced under the medium fluid pressure to compress the material in the housing 66. Then, the ram 69 is retracted and a further charge of material is introduced into the extruder housing, and thereafter the ram 69 is again advanced to compress the new charge of material. The procedure is repeated for several cycles and in this process the extruding opening 75 is air-tightly clogged by the metal. Then, the control valve 29 is opened so that vacuum is applied to the interior of the extruder housing to exhaust the air entrapped among metal chips or scraps. Simultaneously, the ram 69 is advanced under a high pressure to extrude the material through the die.

The suction passage 72 is connected with the vacuum pump through the flexible hose 74 and the outlet end of the passage 72 is located at a position which is out of the extruder housing 66 even when the ram 69 is extremely advanced position, so that the movement of the ram 69 is not interferred by the connection of the suction line. Since the evacuating aperture 71 in the dummy block 70 is small in relation to the extruding opening 75 in the die, there is no possibility that the material enters the aperture 71. The control valve 29 may be so designed that it is controlled in response to the pressure in the suction passage 72.

In the above process, the extruding opening 75 in the die has been clogged by the material to be extruded, before suction pressure is applied to the interior of the extruder housing 66, however, the opening 75 may be clogged by other means. When the discard exists in the extruding opening, it may serve as the means for clogging the opening.

Figure 8:
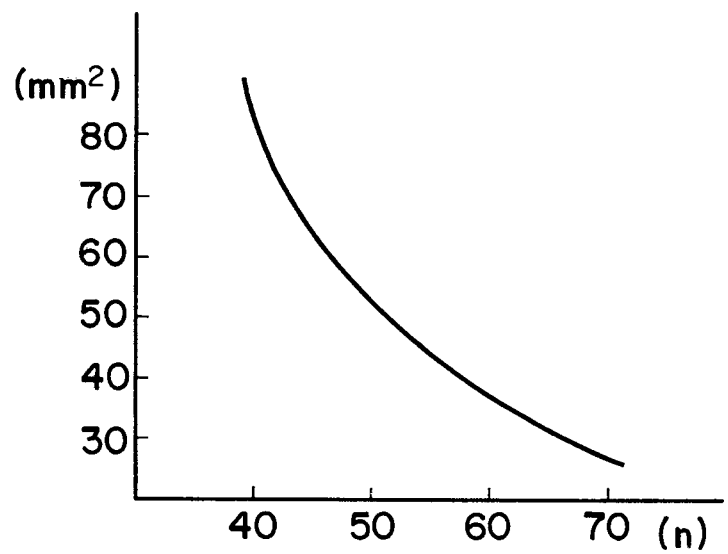
FIG. 8 is a diagram showing the relationship between the extruding ratio and the area of chips.

FIG. 8 shows the relationship between the extruding ratio (the ratio of the cross-sectional area of the extruder and that of the extruded product) and the area of metal chip in an extrusion having the yielding point (the stress at which 0.2% permanent elongation is produced) of about 18 kg/mm$^2$. From the drawing, it will be seen that, by suitably selecting the chip dimension with respect to the extruding ratio, it is possible to obtain an extrusion having the yielding point stress of about 18 kg/mm$^2$ or more. Further, it will be appreciated in FIG. 8, that in a case wherein the extrusion ratio is 60, the minimum dimension of the chips may be determined to about 36 mm$^2$ to obtain an extrusion having the yielding point stress of about 18 kg/mm$^2$ or more. Similar tendency is seen with respect to extruders having other extruding ratio. Thus, it will be seen that it is important to determine the chip dimensions with respect to the extruding ratio to obtain uniform and strong extrusions.

The extruded structural profiles are then subjected to cooling process as taught by the co-pending U.S. patent application Ser. No. 324,448 filed by Toshiro Takahashi on Jan. 17, 1973. Thereafter, the products are corrected as necessary, subjected to chemical and mechanical pretreatment, to anodizing and painting. After painting, the extrusions are heated in a furnace so that the paint coatings are baked and at the same time the age hardening is proceeded. It is preferable that the heating is performed under the temperature of 205° ± 5° C for 50 to 120 minutes or 190° ± 10° C for 20 to 50 minutes. Through the heating, intermetal compounds such as Mg$_2$Si can uniformly be produced in the extrusion so that it is possible to obtain aluminum alloy extrusions similar to those produced from casted billets.

The invention has thus been shown and described with reference to preferred embodiments, however, it should be noted that the invention is in no way limited to the details of the illustrated embodiments but changes and modifications may be made without departing from the scope of the appended claims.

We claim:

1. A method of producing extruded structural profiles from aluminum based scrap materials comprising steps of; introducing aluminum based scrap materials into the extrusion chamber of an extruder housing having an extruder opening in communication with the chamber, exhausting air from the extruder housing chamber and from in and about the scrap materials in the extrusion chamber to substantially eliminate voids in the final profiles, preventing air from being drawn into the extruder housing chamber while air is being exhausted therefrom, extruding the scrap material through the extruder opening under a temperature suitable for hot extrusion, providing scrap materials in the form of finely divided metal chips, packing such materials in a mesh cage consisting of the same material as the scrap metal chips, and inserting the packaged scrap metal chips and cage into the extruder housing chamber.

2. A method according to claim 1 including closing the extruder opening to prevent air from being drawn into the extruder housing chamber while air is exhausted therefrom.

3. A method according to claim 1 including subjecting the scrap metal chips to a suction pressure below 50 mm Hg to exhaust the air entrapped therein.

4. A method according to claim 1 including compressing the mesh cage containing the scrap materials into a semi-compacted body after the air is exhausted from the chamber and then extruding the scrap materials with the mesh cage.

5. A method according to claim 1 in which the divided metal chips have dimensions of at least 25 mm$^2$.

* * * * *